United States Patent
Elman et al.

(10) Patent No.: US 7,211,304 B2
(45) Date of Patent: *May 1, 2007

(54) MULTILAYER OPTICAL COMPENSATOR, LIQUID CRYSTAL DISPLAY, AND PROCESS

(75) Inventors: James F. Elman, Fairport, NY (US); William J. Gamble, Rochester, NY (US); Daniel F. Hurley, Webster, NY (US)

(73) Assignee: Nitto Denko Corporation, Ibaraki-shi (JP)

( * ) Notice: Subject to any disclaimer, the term of this patent is extended or adjusted under 35 U.S.C. 154(b) by 212 days.

This patent is subject to a terminal disclaimer.

(21) Appl. No.: 10/859,670

(22) Filed: Jun. 3, 2004

(65) Prior Publication Data

US 2005/0270459 A1 Dec. 8, 2005

(51) Int. Cl.
*G02F 1/3363* (2006.01)

(52) U.S. Cl. .................. 428/1.3; 428/1.1; 427/162; 427/163.3; 349/117; 349/118; 349/119; 349/120; 349/121

(58) Field of Classification Search ........ 428/1.1–1.33; 349/117–121; 427/162, 163.3
See application file for complete search history.

(56) References Cited

U.S. PATENT DOCUMENTS

| | | | | |
|---|---|---|---|---|
| 5,344,916 A * | 9/1994 | Harris et al. | ................ | 528/353 |
| 5,480,964 A * | 1/1996 | Harris et al. | ................ | 528/353 |
| 5,750,641 A * | 5/1998 | Ezzell et al. | ................ | 528/353 |
| 6,238,753 B1 * | 5/2001 | Ezzell et al. | ................ | 428/1.3 |
| 6,411,344 B2 * | 6/2002 | Fujii et al. | ................ | 349/12 |
| 6,512,561 B1 * | 1/2003 | Terashita et al. | ............ | 349/118 |
| 6,590,707 B1 * | 7/2003 | Weber | ................ | 359/498 |
| 6,628,359 B1 * | 9/2003 | Terashita et al. | ............ | 349/120 |
| 6,630,973 B1 * | 10/2003 | Matsuoka et al. | .......... | 349/117 |
| 6,822,713 B1 * | 11/2004 | Yaroshchuk et al. | ........ | 349/117 |
| 6,853,424 B2 * | 2/2005 | Elman et al. | ................ | 349/117 |

(Continued)

FOREIGN PATENT DOCUMENTS

EP 0 367 288 5/1991

(Continued)

OTHER PUBLICATIONS

James Elman, Declaration under Rule 132, dated Nov. 21, 2005, from correlated U.S. Appl. No. 10/631,152.*

(Continued)

*Primary Examiner*—Rena L. Dye
*Assistant Examiner*—Sow-Fun Hon
(74) *Attorney, Agent, or Firm*—Westerman, Hattori, Daniels & Adrian, LLP.

(57) ABSTRACT

A multilayer compensator includes one or more polymeric first layers and one or more polymeric second layers. The first layers comprise a polymer having an out-of-plane ($\Delta n_{th}$) birefringence not more negative than $-0.01$ or not more positive than $+0.01$. The second layers comprise an amorphous polymer having an out-of-plane birefringence more negative than $-0.01$ or more positive than $+0.01$. An overall in-plane retardation ($R_{in}$) of the multilayer compensator is greater than 20 nm and the out-of-plane retardation ($R_{th}$) of the multilayer compensator is more negative than $-20$ nm or more positive than $+20$ nm. The in-plane retardation (Rin) of the one or more first layers is 30% or less of the overall in-plane retardation (Rin) of the multilayer compensator.

43 Claims, 8 Drawing Sheets

U.S. PATENT DOCUMENTS

| | | | |
|---|---|---|---|
| 6,937,310 B2 * | 8/2005 | Elman et al. | 349/118 |
| 6,964,795 B2 * | 11/2005 | Elman et al. | 428/1.3 |
| 6,995,395 B2 * | 2/2006 | Elman et al. | 257/59 |
| 7,083,835 B2 * | 8/2006 | Elman et al. | 428/1.3 |
| 2002/0192445 A1 * | 12/2002 | Ezzell et al. | 428/212 |
| 2003/0086033 A1 * | 5/2003 | Sasaki et al. | 349/96 |
| 2003/0219549 A1 * | 11/2003 | Shimizu | 428/1.1 |
| 2004/0227879 A1 | 11/2004 | Elman et al. | |
| 2005/0024561 A1 | 2/2005 | Elman et al. | |
| 2005/0030456 A1 * | 2/2005 | Murakami et al. | 349/117 |
| 2005/0058781 A1 * | 3/2005 | Hayashi et al. | 428/1.3 |
| 2005/0231839 A1 * | 10/2005 | Murakami et al. | 359/883 |
| 2006/0072221 A1 | 4/2006 | Nishikouji et al. | |
| 2006/0176427 A1 | 8/2006 | Yoshimi et al. | |

FOREIGN PATENT DOCUMENTS

| | | |
|---|---|---|
| EP | 0 544 008 | 6/1993 |
| EP | 1 387 210 | 2/2004 |
| JP | 0544013 A1 * | 6/1993 |
| JP | 1118885 A1 * | 7/2001 |
| WO | 2005/012962 | 10/2005 |
| WO | 2005/022214 | 10/2005 |
| WO | 2005/111676 | 11/2005 |
| WO | 2005/121848 | 12/2005 |

OTHER PUBLICATIONS

Arthur Kluegel, Remarks section section dated Nov. 21, 2005, from correlated U.S. Appl. No. 10/631,152.*
English Abstract, JP 2002-210766, Jul. 2002, Murakami et al.*
English Abstract, JP 2003-344657, Dec. 2003, Murakami et al.*
English Abstract, JP 20003-344658, Dec. 2003, Murakami et al.*
English Abstract, JP 2004-046068, Feb 2004, Murakami et al.*
English Abstract, JP 2004-046097, Feb. 2004, Hayashi et al.*
English Translation of JP 2003-344856, Dec. 2003, Oji et al.*
English Translation of JP 2003-344657, Dec. 2003, Murakami et al.*

* cited by examiner

OFF

ON

MULTILAYER OPTICAL COMPENSATOR, LIQUID CRYSTAL DISPLAY, AND PROCESS

FIELD OF THE INVENTION

The present invention relates to a multilayer optical compensator for liquid crystal displays. The invention also relates to a process for making such a compensator and liquid crystal displays using the compensator.

BACKGROUND OF THE INVENTION

Liquid crystals are widely used for electronic displays. In these display systems, a liquid crystal cell is typically situated between a pair of polarizer and analyzers. An incident light polarized by the polarizer passes through a liquid crystal cell and is affected by the molecular orientation of the liquid crystal, which can be altered by the application of a voltage across the cell. The altered light goes into the analyzer. By employing this principle, the transmission of light from an external source including ambient light, can be controlled. The energy required to achieve this control is generally much less than required for the luminescent materials used in other display types such as cathode ray tubes (CRT). Accordingly, liquid crystal technology is used for a number of electronic imaging devices, including but not limited to digital watches, calculators, portable computers, and electronic games for which light-weight, low-power consumption and long-operating life are important features.

Contrast, color reproduction, and stable gray scale intensities are important quality attributes for electronic displays, which employ liquid crystal technology. The primary factor limiting the contrast of a liquid crystal display (LCD) is the propensity for light to "leak" through liquid crystal elements or cells, which are in the dark or "black" pixel state. Furthermore, the leakage and hence contrast of a liquid crystal display are also dependent on the direction from which the display screen is viewed. Typically the optimum contrast is observed only within a narrow viewing angle range centered about the normal incidence to the display and falls off rapidly as the viewing direction deviates from the display normal. In color displays, the leakage problem not only degrades the contrast but also causes color or hue shifts with an associated degradation of color reproduction.

LCDs are quickly replacing CRTs as monitors for desktop computers and other office or household appliances. It is also expected that the number of LCD television monitors with a larger screen size will sharply increase in the near future. However, unless problems of viewing angle dependence such as hue shift, degradation in contrast, and an inversion of brightness are solved, LCD's application as a replacement of the traditional CRT will be limited.

A Vertically-Aligned liquid crystal display (VA-LCD) offers an extremely high contrast ratio for normal incident light. FIG. 2A and FIG. 2B are the schematics of VA liquid crystal cell in OFF 201 and ON 203 states. In its OFF state, the liquid crystal optic axis 205 is almost perpendicular to the substrate 207, FIG. 2A. With an applied voltage, the optic axis 205 is tilted away from the cell normal, FIG. 2B. In the OFF state, light does not see the birefringence in the normal direction 209, giving the dark state that is close to that of orthogonally crossed polarizers. However, obliquely propagated light 211 picks up retardation giving light leakage. This results in a poor contrast ratio in some viewing angle range.

A bend aligned nematic liquid crystal display, also referred as an Optically Compensated Bend Liquid Crystal Display (OCB-LCD) uses a nematic liquid crystal cell based on the symmetric bend state. In its actual operation, the brightness of the display using the bend aligned nematic liquid crystal cell is controlled by an applied voltage or field that leads to a different degree in the bend orientation within the cell as shown in FIG. 3A (OFF) 301 and FIG. 3B (ON) 303. In both states, the liquid crystal optic axis 305 takes symmetric bend state around the cell middle plane 307. In the On state, the optic axis becomes substantially perpendicular to the cell plane except near the cell substrates 309. OCB mode offers faster response speed that is suitable to the liquid crystal display television (LCD-TV) application. It also has advantages in viewing angle characteristic (VAC) over conventional displays, such as Twisted Nematic liquid crystal display (TN-LCD).

The above-mentioned two modes, due to their superiority over the conventional TN-LCD, are expected to dominate the high-end application such as LCD-TV. However, practical applications of both OCB and VA-LCDs require optical compensating means to optimize the VAC. In both modes, due to the birefringence of liquid crystal and crossed polarizer, VAC suffers deterioration in contrast when the displays are viewed from oblique angles. Use of biaxial films have been suggested to compensate the OCB (U.S. Pat. No. 6,108,058) and VA (JP1999-95208) LCDs. In both modes, liquid crystals align sufficiently perpendicular to the plane of the cell in ON(OCB) or OFF (VA) states. This state gives positive $R_{th}$, thus the compensation films have to have sufficiently large negative $R_{th}$ for satisfactory optical compensation. The need for a biaxial film with a large Rth is also common for Super Twisted Nematic Liquid Crystal Display (STN-LCD).

Several methods of manufacturing biaxial films with sufficient negative value of $R_{th}$ suitable for compensating LCD modes such as OCB, VA and STN have been suggested.

U.S. 2001/0026338 discloses a use of retardation increasing agent in combination with triacetylcellulose (TAC). The retardation-increasing agent is chosen from aromatic compounds having at least two benzene rings. By stretching agent doped TAC, one can generate both $R_{th}$ and $R_{in}$. The problems with this method is that the amount of the doping agent. To generate the desired effects of increasing $R_{th}$ and $R_{in}$, the necessary amount of agent can be high enough to cause unwanted coloration, or movement (diffusion) of the agent into other layers in the LCD with a resulting loss of $R_{th}$ and $R_{in}$ and undesired chemistry in these adjacent layers. With this method, it is difficult to control the values of $R_{th}$ and $R_{in}$ independently.

Sasaki et al. proposes (US2003/0086033) the use of cholesteric liquid crystal disposed on the positively birefringent thermoplastic substrate. The pitch of the cholesteric liquid crystal (CHLC) is shorter than the wavelength of the visible light, thus properly aligned CHLC exhibits form birefringence giving negative $R_{th}$. $R_{in}$ is controlled by adjusting the stretching amount of the thermoplastic substrate. The method enables one to adjust $R_{th}$ and $R_{in}$ separately. However, the use of short pitch CHLC not only makes the manufacturing cost high but also complicates the processing due to the alignment procedure.

JP2002-210766 discloses the use of propionyl or butyryl substituted TAC. They show higher birefringence than ordinary TAC. Thus, by biaxially stretching the substituted TAC film, one generates $R_{in}$ and $R_{th}$. The method does not require any additional coating or layer but it suffers a difficulty of independent control of $R_{in}$ and $R_{th}$.

Thus, it is a problem to be solved to provide a multilayer optical compensator with independently controlled $R_{th}$ and $R_{in}$ that can be readily manufactured.

SUMMARY OF THE INVENTION

The invention provides a multilayer compensator that includes one or more polymeric first layers and one or more polymeric second layers. The first layers comprise a polymer having an out-of-plane ($\Delta n_{th}$) birefringence not more negative than −0.01 or not more positive than +0.01. The second layers comprise an amorphous polymer having an out-of-plane birefringence more negative than −0.01 or more positive than +0.01. An overall in-plane retardation ($R_{in}$) of the multilayer compensator is greater than 20 nm and the out-of-plane retardation ($R_{th}$) of the multilayer compensator is more negative than −20 nm or more positive than +20 nm. The in-plane retardation (Rin) of the one or more first layers is 30% or less of the overall in-plane retardation (Rin) of the multilayer compensator.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The following definitions apply to the description herein:

Optic axis refers to the direction in which propagating light does not see birefringence.

ON and OFF state refers to the state with and without applied voltage to the liquid crystal cell.

Figure 1:
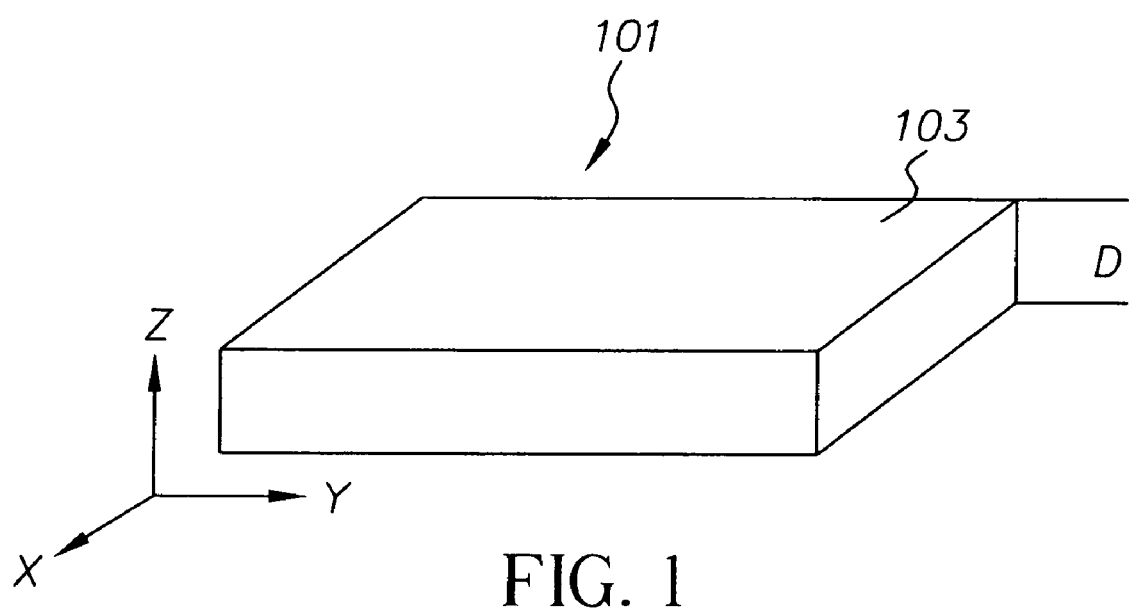
FIG. 1 is a view of a typical layer with thickness d and x-y-z coordinate system attached to the layer.
Figure 2A:
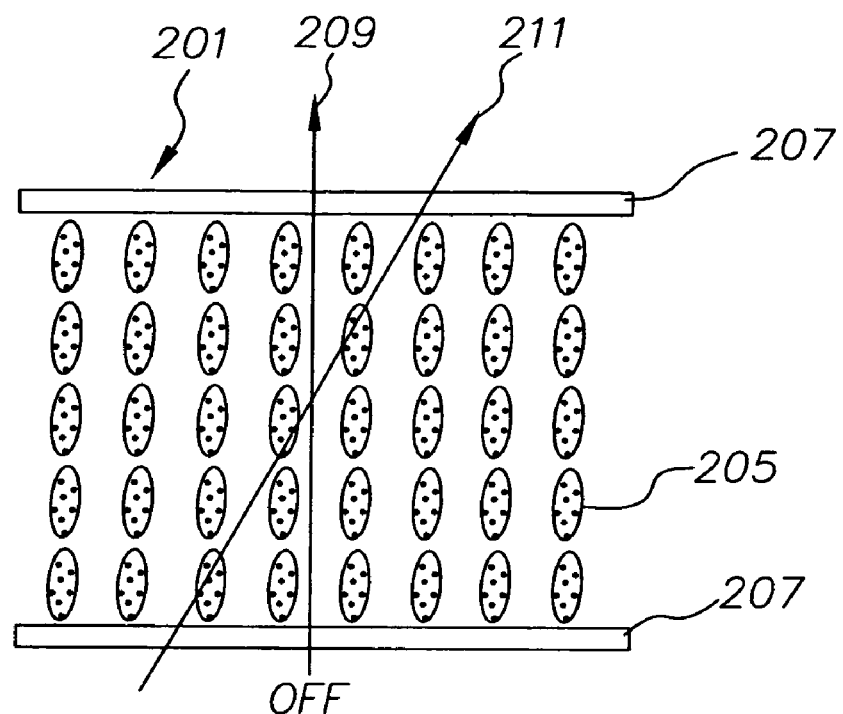
FIG. 2A and FIG. 2B are schematics showing, respectively, the typical ON and OFF state of the VA liquid crystal cell.
Figure 2B:
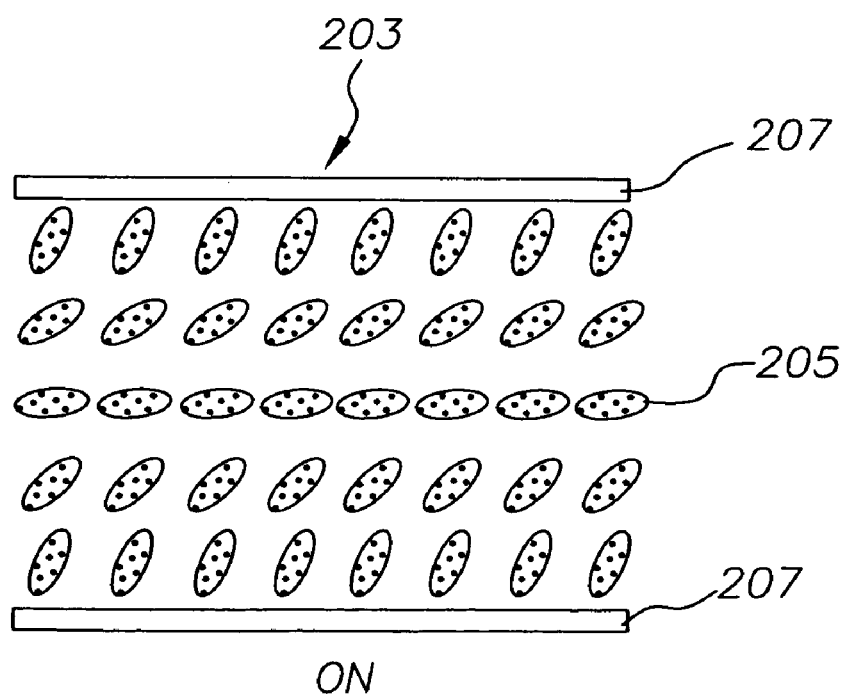
Figure 3A:
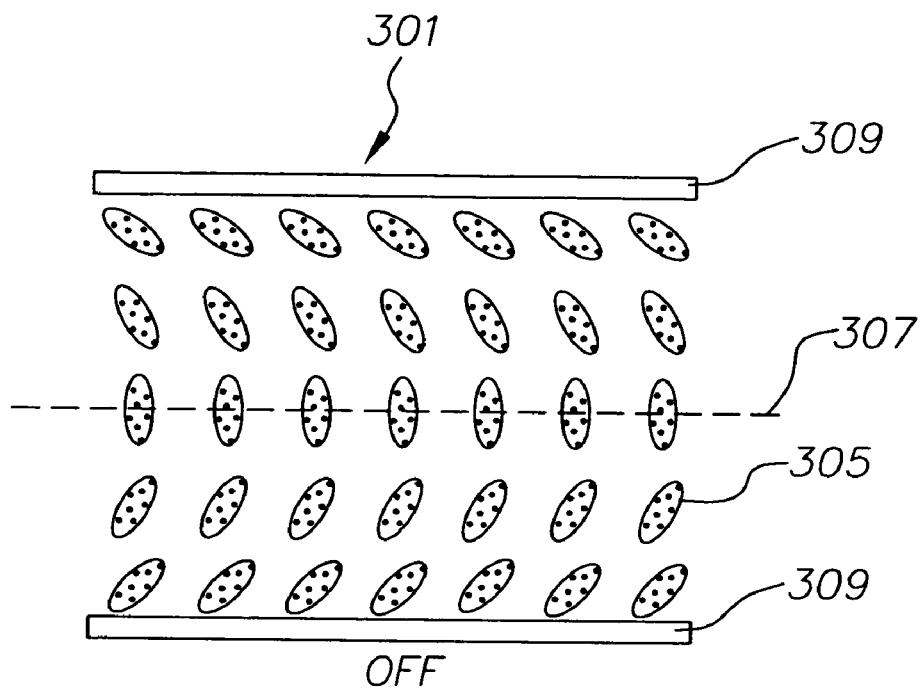
FIG. 3A and FIG. 3B are schematics showing, respectively, the typical ON and OFF states of the OCB liquid crystal cell.
Figure 3B:
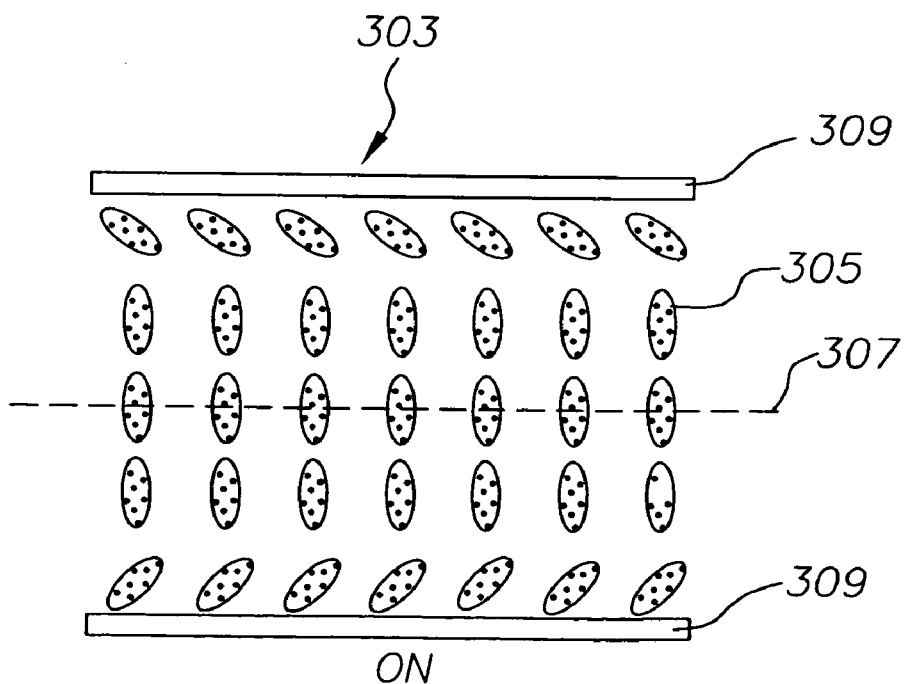

In-plane retardation, $R_{in}$, of a layer 101 shown in FIG. 1 is a quantity defined by (nx−ny)d, where nx and ny are indices of refraction in the direction of x and y. The x axis is taken as a direction of maximum index of refraction in the x-y plane and the y direction is perpendicular to the x axis. Thus $R_{in}$ will always be a positive quantity. The x-y plane is parallel to the plane 103 of the layer. d is a thickness of the layer in the z-direction. The quantity (nx-ny) is referred to as in-plane birefringence, $\Delta n_{in}$. It also will always have positive values. The values of $\Delta n_{in}$ and $R_{in}$ hereafter are given at wavelength λ=550 nm.

Out of-plane retardation, $R_{th}$, of a layer 101 shown in FIG. 1, herein, is a quantity defined by [nz−(nx+ny)/2]d. nz is the index of refraction in z-direction. The quantity [nz−(nx+ny)/2] is referred to as out-of-plane birefringence, $\Delta n_{th}$. If nz>(nx+ny)/2, $\Delta n_{th}$ is positive, thus the corresponding $R_{th}$ is also positive. If nz<(nx+ny)/2, $\Delta n_{th}$ is negative and $R_{th}$ is also negative. The values of $\Delta n_{th}$ and $R_{th}$ hereafter are given at λ=550 nm.

Figure 6A:
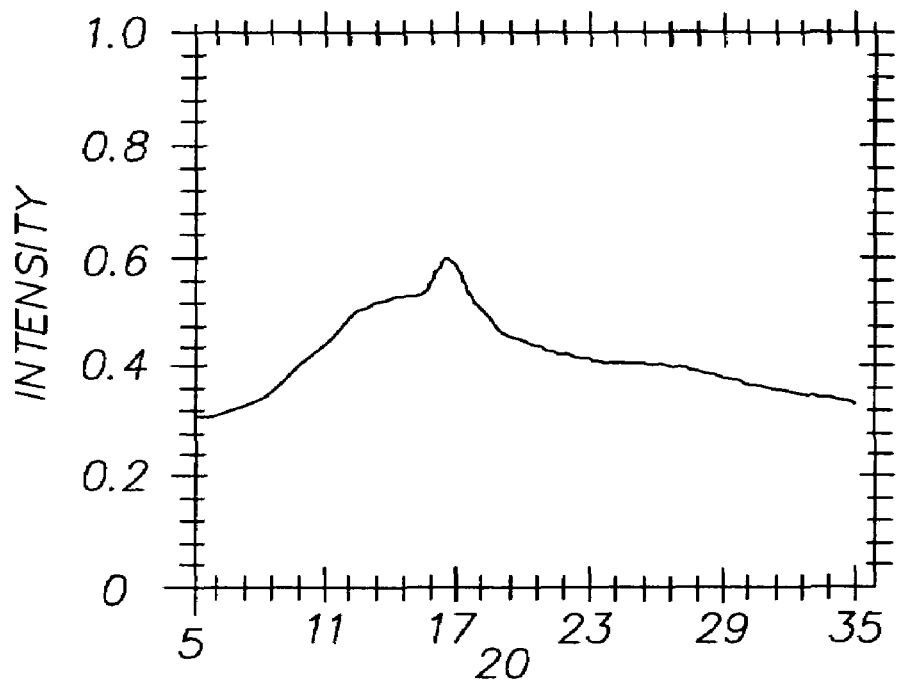
FIG. 6A illustrates a wide-angle X-ray diffraction pattern for the transmission mode of a highly ordered, non-amorphous material.
Figure 6B:
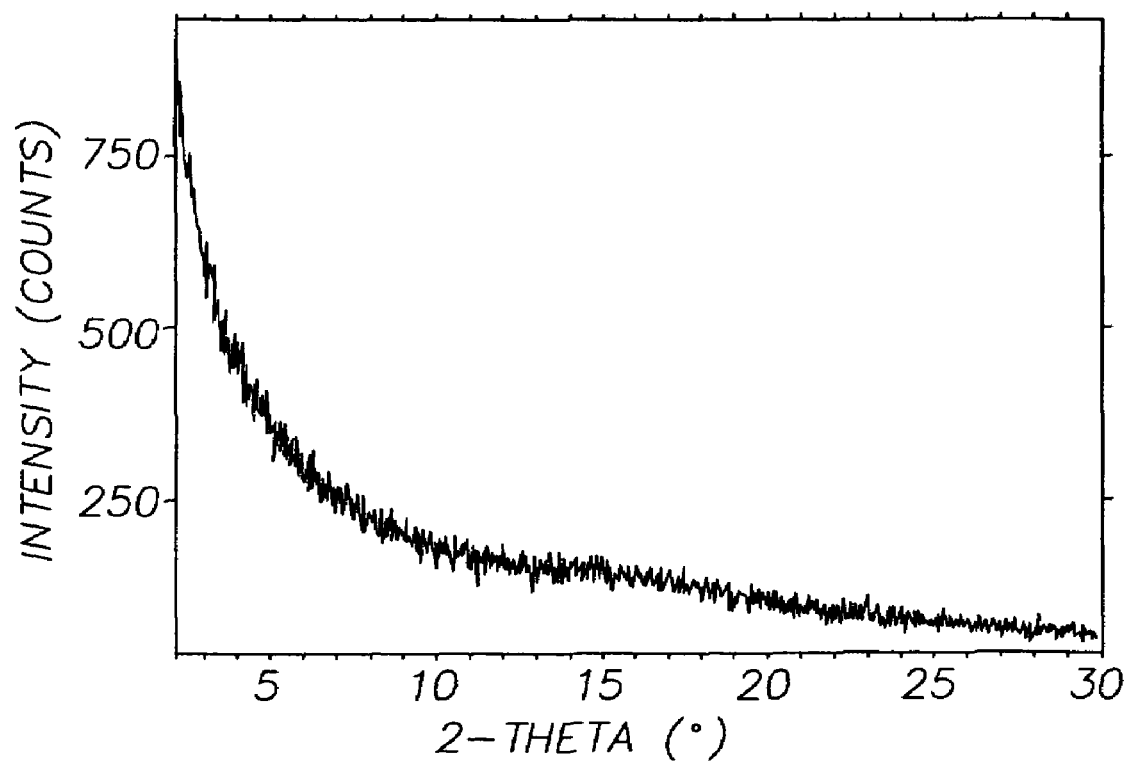
FIG. 6B is a wide-angle X-ray diffraction pattern for the transmission mode of an amorphous polymer of the present invention.

Amorphous means a lack of long-range order. Thus an amorphous polymer does not show long-range order as measured by techniques such as X-ray diffraction. This is demonstrated, by example only, by the contrasting graphic characteristics illustrated in FIGS. 6A and 6B. FIG. 6A illustrates a wide-angle X-ray diffraction pattern (transmission mode) of a rigid rod polymer, specifically a (BPDA-TFNB)$_{0.5}$-(PMDA-TFMB)$_{0.5}$ polyimide as referenced in U.S. Pat. No. 5,344,916. FIG. 6B is a wide-angle X-ray diffraction pattern (transmission mode) of an amorphous polymer of the present invention [poly(4,4'-hexafluoroisopropylidene-bisphenol-co-4,4'-(2-norbornylidene) bisphenol) terephthalate-co-isophthalate].

Chromophore means an atom or group of atoms that serve as a unit in light adsorption. (*Modern Molecular Photochemistry* Nicholas J. Turro Editor, Benjamin/Cummings Publishing Co., Menlo Park, Calif. (1978) Pg 77). Typical chromophore groups include vinyl, carbonyl, amide, imide, ester, carbonate, aromatic (i.e. heteroaromatic or carbocylic aromatic such as phenyl, naphthyl, biphenyl, thiophene, bisphenol), sulfone, and azo or combinations of these groups.

Non-visible chromophore means a chromophore that has an absorption maximum outside the range of 400–700 nm.

Contiguous means that articles are in contact with each other. In two contiguous layers, one layer is in direct contact with the other. Thus, if a polymer layer is formed on the substrate by coating, the substrate and the polymer layers are contiguous.

Commonly assigned U.S. patent application Ser. No. 10/631,152, filed Jul. 31, 2003, is incorporated herein by reference. In that application, a multilayer optical compensator is disclosed in which at least one embodiment thereof is characterized by the provision of an amorphous polymer coated onto the surface of a previously stretched polymer support layer. The support layer is stretched to generate an in-plane retardation that is greater than 20 nm.

As explained herein, the present invention is at least partially characterized by simultaneous stretching of both (or all) layers of the multilayer optical compensator after the amorphous polymer layer has been coated onto the surface of the polymer support. The stretching can take place while the compensator is in a "wet" state, i.e., after co-casting (or coating) of the layers and prior to (or concurrently with) drying of the amorphous polymer. Alternately, or in addition, "dry" stretching can occur after the multilayer compensator has been cast and the amorphous polymer dried. Stretching can occur in a transverse direction, i.e., in a direction coincident with a casting direction of the film. Alternately, or in addition, stretching can occur in a direction perpendicular the transverse direction. Also alternately, or in addition, stretching can occur obliquely relative to the transverse direction (i.e. in a diagonal fashion).

In various liquid crystal displays, it is desirable to modify the birefringence of polarizer stack layers, to optimize the viewing angle for the complete screen system. The manufacturing methods of embodiments of the present invention, in combination with specific polymers, allow a basic sheet of triacetylcellulose (TAC) to be modified by a second layer (or co-cast) of amorphous polymer. The thickness of the TAC and the second layer polymer can be varied to provide a "tunable" package of optical properties. In wet-stretching, stresses applied to the sheet during manufacturing can control the in-plane (x, y) retardation and the thickness of the second layer polymer can control the out-of-plane retardation. Likewise, in dry-stretching, stresses applied to the sheet after manufacturing can control the in-plane (x, y) retardation and the thickness of the second layer polymer can control the out-of-plane retardation. This application of amorphous polymers can result in a simple way to create a useful sheet in a cost effective manner.

The multilayer optical compensator may be realized by the use of two extrusion hoppers intimately stacked on top of each other. In this case, the two polymer solutions meet at the mated die lips of the stacked hoppers. Co-casting is a laminar layering of two polymers in a single die cavity. The flow characteristics and polymer viscosities are controlled with a feed block, to form two distinct layers in a single die. This operation could also be carried out in two independent hoppers onto the same casting surface. The object is to form the TAC layer (mated to the casting surface) and the second layer polymer (riding on top of the TAC) at the same time on the casting surface. This leads to optimum adhesion between the polymers. An alternative is to cast a third adhesion layer between the TAC and the second layer, if superior adhesion is desired.

In the experiments as explained in more detail below, four, second layer polymers were co-cast onto TAC (typical 2.86 acetyl substitution, 220,000 M.W. polymer). All of the polymers were dissolved in a methylene chloride or methylene chloride and methanol solutions. The multilayered optical compensator was produced at nearly 3.1 mils (80 microns total). The machine line speed was varied from 4 to 6 ft/min. This provides a casting surface drying time of 3 to 4 minutes. At the end of the casting surface the curing web is stripped from the (highly polished) casting surface and fed to edge restraint belts. The edge belts are two endless belts, which are brought together to form a serpentine path, with the drying film caught in the nip between the two belts. These belts are described in U.S. Pat. No. 6,152,345 and U.S. Pat. No. 6,108,930, the contents of which are incorporated herein by reference.

When the wet (significant amounts of solvent present) sheet is in the edge belts, heated drying air is blown at the sheet from both sides. The air is forced at high temperature and high velocity, to impart rapid heating and drying. If the forced air drying is rapid and temperatures do not exceed the Tg (of the sheet and solvent combination) transverse stresses can be created to neutralize the machine direction stresses imparted at sheet stripping, or increased beyond that to create a transverse orientation in the two layer sheet. This is not tentering in the intentional, active stretching sense, but merely the restraining of shrinkage forces as the polymer sheet dries. It shall be referred to as "passive tentering". If the heating is applied with sufficient energy, the sheet can be taken above Tg (of the solvent and polymer mixed) and the drying and stripping stresses can be relaxed out. By using this method the in-plane stresses and retardations can be manipulated in magnitude and orientation.

The out of plane retardation (Rth) of an 80 micron TAC sheet varies from approximately −80 nm to an annealed value of about −40 nm. The TAC Rth can be manipulated by casting surface time and temperature in the restrained heating section.

The second layer of amorphous polymer requires rapid drying to retain its birefringence. The second layer dries rapidly from a volatile solvent on top of the TAC layer. The solvent from the drying TAC sheet does not soften the second layer sufficiently to allow relaxation of the molecules. The thickness of the second layer polymer can be varied to control the optical properties of the multilayered compensator. The Rin of the second layer amorphous polymer can be manipulated by restraint and temperature as described before (for TAC).

Table A below show the results of experiments for examining the birefringence of optical compensators obtained by co-casting and wet stretching in accordance with embodiments of the present invention. The first sample was a TAC layer only, with no second layer polymer. The remaining samples each included a second layer polymer on an underlying TAC layer. In all samples, the TAC layer was formed from a polymer solution of 18.7% wt % TAC, 73.2 wt % methylene chloride and 8.1 wt % methanol.

Table A shows the thickness of the underlying TAC and the thickness of the second layer polymer for each of the samples. Each of the samples was obtained by placing the samples while still wet into edge restraint belts and applying plenum heat. The belts resist shrinkage and provide wet passive tentering in the transverse direction. The air flow temperatures of samples are also shown. The width of each sample as cast and the width of each sample after wet passive tentering were measured to calculate the approximate degree (%) of transverse stretch.

Table A shows the resultant in-plane and out-of-plane retardation of each sample. These retardations were measured with an ellipsometer (model M2000V, J. A. Woollam Co.) at 550 nm wavelength. As is apparent from these results, the magnitude of in-plane and out-of-plane retardation correlates to the degree of stretch and the thickness of the second layer.

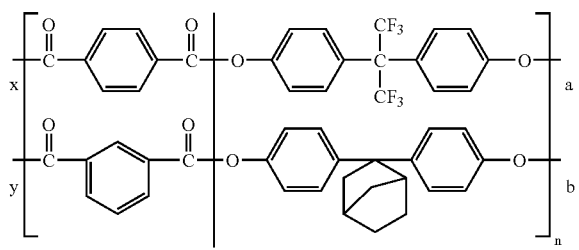

where x=93, y=7
and a=70, b=30

Poly(4,4'-hexafluoroisopropylidene-bisphenol-co-4,
4'-(2-norbornylidene) bisphenol) terephthalate-co-
isophthalate Polymer A

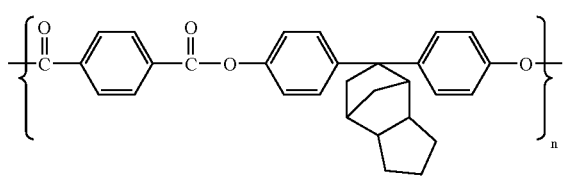

Poly(4,4'-hexahydro-4,7-methanoindan-5-ylidene
bisphenol) terephthalate

Polymer B

It has also been found by the inventors that stretching ("active tentering") of an already dried multilayer optical compensator (6 μm of polymer C on 1 μm of bovine gelatin on 80 μm, of TAC) produced desirable amounts of in-plane anisotropy.

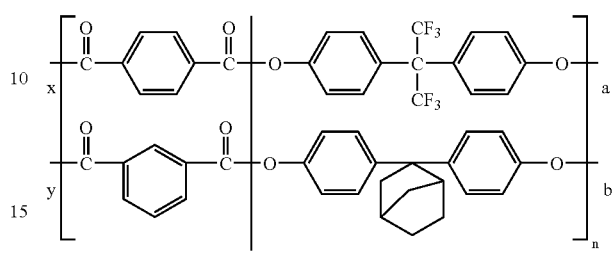

where x=90, y=10
and a=70, b=30

Poly(4,4'-hexafluoroisopropylidene-bisphenol-co-4,
4'-(2-norbornylidene) bisphenol) terephthalate-co-
isophthalate Polymer C This in-plane anisotropy was achieved at convenient temperatures and at very low extensions (2 to 12%). Table B below shows the impact that % extension and temperature had on out-of-plane and in-plane retardation of a multilayer optical compensator having negative out-of-plane birefringence. These retardations were measured with an ellipsometer (model M2000V, J.A. Woollam Co.) at 550 nm wavelength. Two first layers (bovine gelatin and TAC) were used for this example. The bovine gelatin served as a curl control layer. It was noted that adhesion of the second layer and the gelatin layer to the TAC layer was much improved after the heating and stretching. In addition, it is believe that such a multilayer compensator as in this example would have enhanced durability in regards to loss of Rin and Rth after aging such a compensator in conditions such as 1000 hours at 60° C. and 90% relative humidity

TABLE B

| % Extension = % Stretch | Temp. (° C.) | Rth (nm) | Rin (nm) |
|---|---|---|---|
| 0 | room temp. | −244 | 2 |
| 2 | 145 | −230 | 15 |
| 5 | 145 | −222 | 22 |

TABLE A

| Second Layer Polymer | First Layer (TAC) Thickness (μm) | Second Layer Thickness (μm) | Air Flow Temperature (° C.) | % Stretch = % Extension | $R_{th}$ (nm) | $R_{in}$ (nm) |
|---|---|---|---|---|---|---|
| None | 70.5 | 0 | 65 | 0 | −50 | 2 |
| Polymer A | 71.1 | 5.7 | 65 | 0.7 | −67 | 20 |
| Polymer A | 68.6 | 10.2 | 65 | 3.2 | −63 | 34 |
| Polymer A | 70.5 | 12.7 | 93 | 4.7 | −95 | 54 |
| Polymer A | 71.1 | 19.0 | 121 | 8.6 | −107 | 126 |
| Polymer B | 61.9 | 2.9 | 65 | 2.7 | −59 | 6 |
| Polymer B | 62.2 | 14.0 | 93 | 5.0 | −78 | 8 |
| Polymer B | 62.2 | 18.4 | 121 | 6.1 | −96 | 23 |

TABLE B-continued

| % Extension = % Stretch | Temp. (° C.) | Rth (nm) | Rin (nm) |
|---|---|---|---|
| 7.5 | 145 | −219 | 29 |
| 10 | 145 | −232 | 68 |
| 0 | room temp. | −244 | 2 |
| 2 | 135 | −213 | 2 |
| 5 | 135 | −230 | 39 |
| 7.5 | 135 | −244 | 50 |
| 10 | 135 | −262 | 65 |

Table C below shows the impact that % extension and temperature had on out-of-plane and in-plane retardation of a multilayer optical compensator (3.5 μm of polymer C on 1 μm of bovine gelatin on 80 μm of TAC) having negative out-of-plane birefringence. These retardations were measured with an ellipsometer (model M2000V, J.A. Woollam Co.) at 550 nm wavelength. Two first layers (bovine gelatin and TAC) were used for this example. The bovine gelatin served as a curl control layer. It was noted that adhesion of the second layer and the gelatin layer to the TAC layer was much improved after the heating and stretching. In addition, it is believe that such a multilayer compensator as in this example would have enhanced durability in regards to loss of Rin and Rth after aging such a compensator in conditions such as 1000 hours at 60° C. and 90% relative humidity.

Notice that in tables A, B, and C a wide variety of Rin and Rth values can be obtained by varying the thickness of the second layer and the % extension.

TABLE C

| % Extension = % Stretch | Temp. (° C.) | Rth (nm) | Rin (nm) |
|---|---|---|---|
| 0 | room temp. | −153 | 2 |
| 5 | 135 | −130 | 22 |
| 7 | 135 | −137 | 34 |

Table D below shows the impact that % extension and temperature have on out-of-plane and in-plane retardation of a multilayer optical compensator (3.6 μm of polymer D on 80 μm of TAC) having positive out-of-plane birefringence. These retardations are measured with an ellipsometer (model M2000V, J.A. Woollam Co.) at 550 nm wavelength.

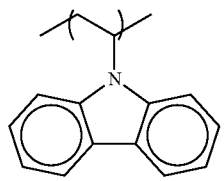

Poly (N-vinylcarbazole)

Polymer D

TABLE D

| % Extension = % Stretch | Temp. (° C.) | Rth (nm) | Rin (nm) |
|---|---|---|---|
| 0 | room temp. | +50 | 2 |
| 5 | 135 | +40 | 20 |
| 7 | 135 | +45 | 35 |

Notice in tables B, C, and D that Rth is primarily controlled by the thickness of the second layer, and that Rin is primarily controlled by the % extension/stretch. Thus, Rth and Rin values can be obtained in an independently controlled (decoupled) manner.

The techniques described above allow for the manufacture of a multilayer compensators described next. That is, the present invention provides a multilayer compensator comprising one or more polymeric first layers and one or more polymeric second layers, wherein the first layers comprise a polymer having an out-of-plane ($\Delta n_{th}$) birefringence not more negative than −0.01 or not more positive than +0.01, and the second layers comprise an amorphous polymer having an out-of-plane birefringence more negative than −0.01 or more positive than +0.01. The overall in-plane retardation ($R_{in}$) of the multilayer compensator is greater than 20 nm and the out-of-plane retardation ($R_{th}$) of said multilayer compensator is more negative than −20 nm or more positive than +20 nm, and wherein the in-plane retardation (Rin) of said one or more first layers is 30% or less of the overall in-plane retardation (Rin) of said multilayer compensator. Optionally, two or more of the first and said second layers are contiguous.

The first layer is made from polymer film that has an out-of-plane ($\Delta n_{th}$) birefringence not more negative than −0.01 or not more positive than +0.01. Examples of such polymers include: triacetylcellulose (TAC), cellulose diacetate, cellulose acetate butyrate, polycarbonate, cyclic polyolefin, polystyrene, polyarylate containing fluorene groups, and other polymers known to those skilled in the art.

A combined thickness of the second layers is preferably less than micrometers, more preferably from 1.0 to 10 micrometers, and even more preferably from 2 to 8 micrometers.

The overall in-plane retardation ($R_{in}$) of the multilayer compensator is preferably between 21 and 200 nm, more preferably between 25 and 150 nm, and even more preferably between 25 and 100 nm.

A combined thickness of the first and second layers is preferably less than 200 micrometers, more preferably from 40 to 150 micrometers, and even more preferably from 80 to 110 micrometers.

In the case where the out-of-plan retardation ($R_{th}$) of the multilayer compensator is more negative than −20 nm, at least one second layer includes a polymer containing in the backbone a non-visible chromophore group and has a $T_g$ above 180° C. The polymer may contain in the backbone a nonvisible chromophore containing a vinyl, carbonyl, amide, imide, ester, carbonate, aromatic, sulfone, or azo, phenyl, naphthyl, biphenyl, bisphenol, or thiophene group. Examples of polymers suitable for the second layers include (1) a poly(4,4'-hexafluoroisopropylidene-bisphenol) terephthalate-co-isophthalate, (2) a poly(4,4'-hexahydro-4,7-methanoindan-5-ylidene bisphenol) terephthalate, (3) a poly (4,4'-isopropylidene-2,2',6,6'-tetrachlorobisphenol) terephthalate-co-isophthalate, (4) a poly(4,4'-hexafluoroisopropylidene)-bisphenol-co-(2-norbornylidene)-bisphenol terephthalate, (5) a poly(4,4'-hexahydro-4,7-methanoindan-5-ylidene)-bisphenol-co-(4,4'-isopropylidene-2,2',6,6'-tetrabromo)-bisphenol terephthalate, (6) a poly(4,4'-isopropylidene-bisphenol-co-4,4'-(2-norbornylidene) bisphenol) terephthalate-co-isophthalate, (7) a poly(4,4'-hexafluoroisopropylidene-bisphenol-co-4,4'-(2-norbornylidene) bisphenol) terephthalate-co-isophthalate, or (8) copolymers of any two or more of the foregoing.

In the case where the out-of-plane retardation ($R_{th}$) of the multilayer compensator is more positive than +20 nm, at least one second layer includes a polymer which contains off the backbone a non-visible chromophore group and has a glass transition temperature (Tg) above 160° C. The non-visible chromophore group may include a carbonyl, amide, imide, ester, carbonate, phenyl, naphthyl, biphenyl, bisphenol, or thiophene group, or a heterocyclic or carbocyclic aromatic group. The polymer of the second layer may contain in the backbone a vinyl, carbonyl, amide, imide, ester, carbonate, aromatic, sulfone, or azo group. Examples of suitable polymers for the second layer include (A) poly (4 vinylphenol), (B) poly (4 vinylbiphenyl), (C) poly (N-vinylcarbazole), (D) poly(methylcarboxyphenylmethacrylamide), (E) poly[(1-acetylindazol-3-ylcarbonyloxy)ethylene], (F) poly(phthalimidoethylene), (G) poly(4-(1-hydroxy-1-methylpropyl)styrene), (H) poly(2-hydroxymethylstyrene), (I) poly(2-dimethylaminocarbonylstyrene), J) poly(2-phenylaminocarbonylstyrene), (K) poly(3-(4-biphenylyl) styrene), (L) poly(4-(4-biphenylyl)styrene), (M) poly(4-cyanophenyl methacrylate), (N) poly(2,6-dichlorostyrene), (O) poly(perfluorostyrene), (P) poly(2,4-diisopropylstyrene), (O) poly(2,5-diisopropylstyrene), and (and R) poly(2, 4,6-trimethylstyrene) or (S) copolymers of any two or more of the foregoing.

Reference will now be made to the drawings in which the various elements of the present invention will be given numerical designations and in which the invention will be discussed so as to enable one skilled in the art to make and use the invention. It is to be understood that elements not specifically shown or described may take various forms well known to those skilled in the art.

Figure 4A:
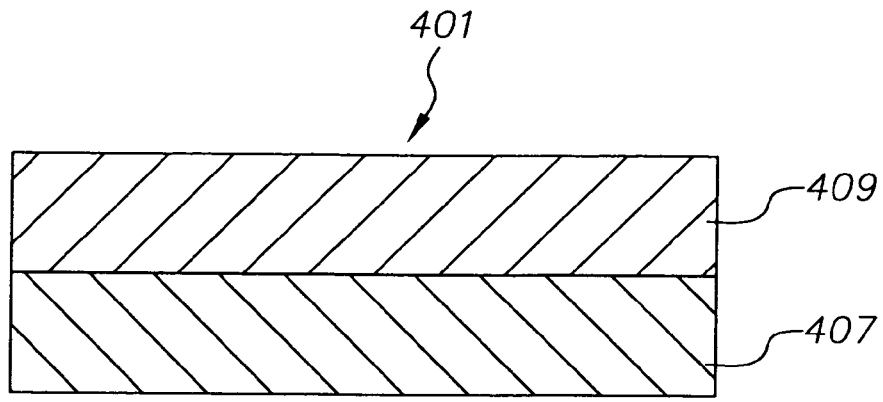
FIG. 4A, FIG. 4B and FIG. 4C are elevation schematics of the multilayer optical compensator of the invention.
Figure 4B:
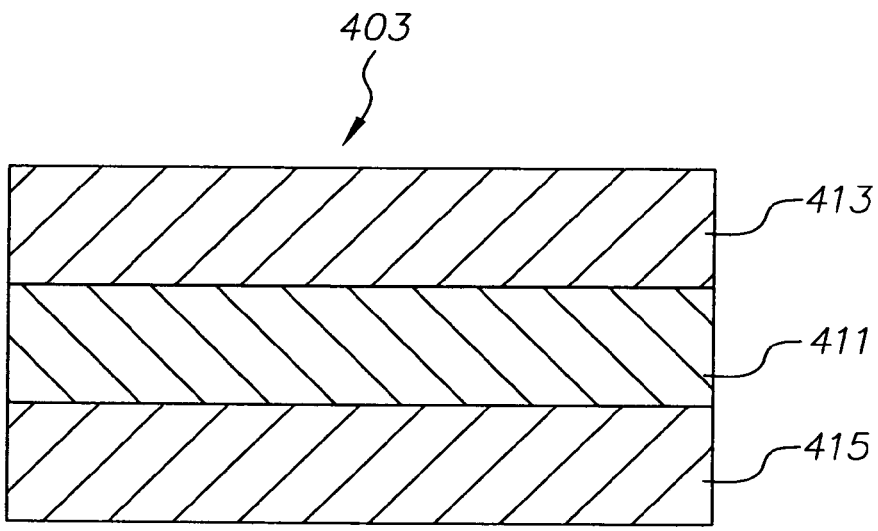
Figure 4C:
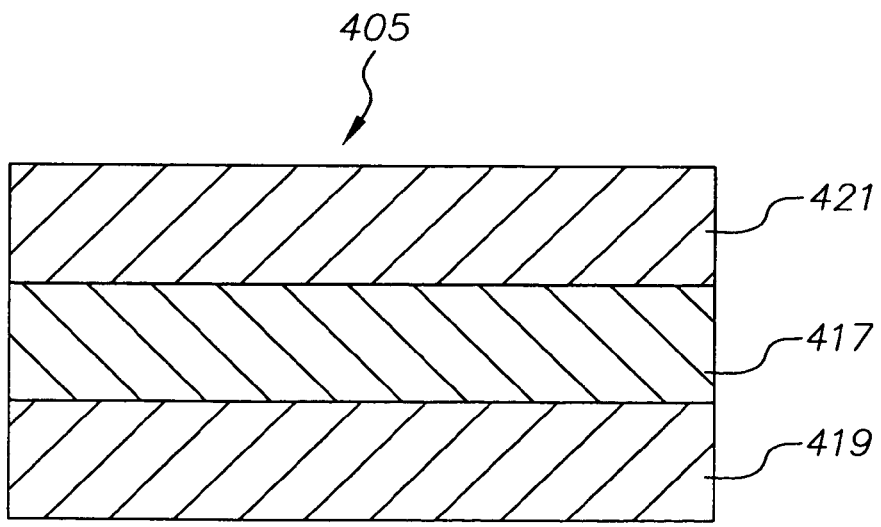

FIG. 4A, FIG. 4B and FIG. 4C are elevation schematics of the exemplary multilayer optical compensators in accordance with the invention which include one or more A polymer layers having an out-of-plane ($\Delta n_{th}$) birefringence not more negative than −0.01, or not more positive than +0.01, and one or more B amorphous polymer layers having an out-of-plane birefringence more negative than −0.01 or more positive than +0.01. Compensator 401 in FIG. 4A has a structure in which a B layer 409 is disposed on an A layer 407. The A layer 407 and the B layer 409 are contiguous. It is also possible to have two B layers 413, 415 disposed on one A layer 411 such as the compensator 403 in FIG. 4B. In other case 405, one B layer 417 is sandwiched by two A layers 419, 421. The compensator 405 can be formed, for example, by laminating contiguous layers of A 421 and B 417, and the single layer of A 419. The lamination is done at the interface of B layer 417 and A layer 419, and the two layers 417 and 419 may or may not be contiguous depending on the method of the lamination. One skilled in the art could conceive of more complex structures.

Figure 5A:
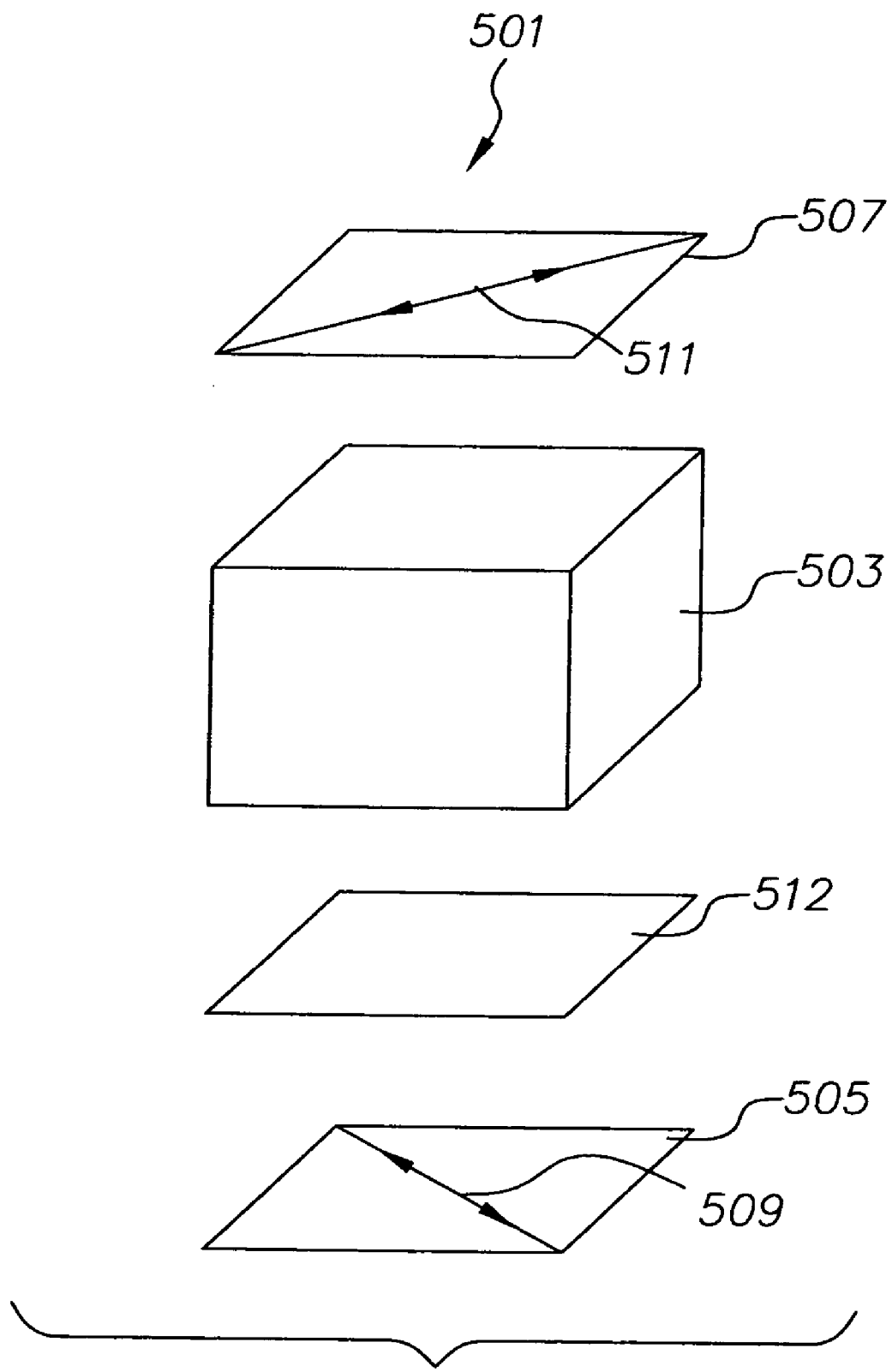
FIG. 5A, FIG. 5B and FIG. 5C are schematics of a liquid crystal display with multilayer optical compensators of the invention.
Figure 5B:
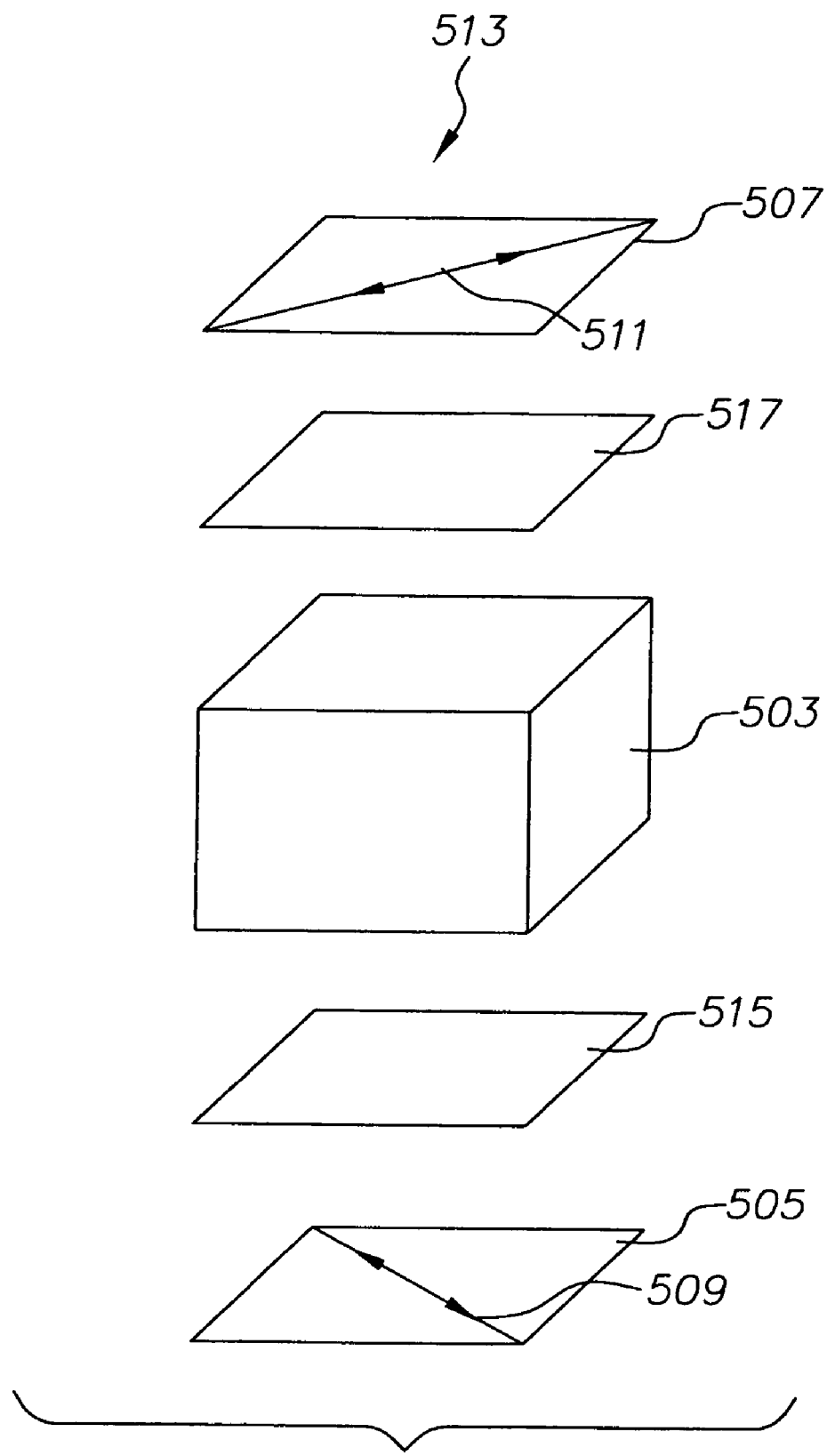
Figure 5C:
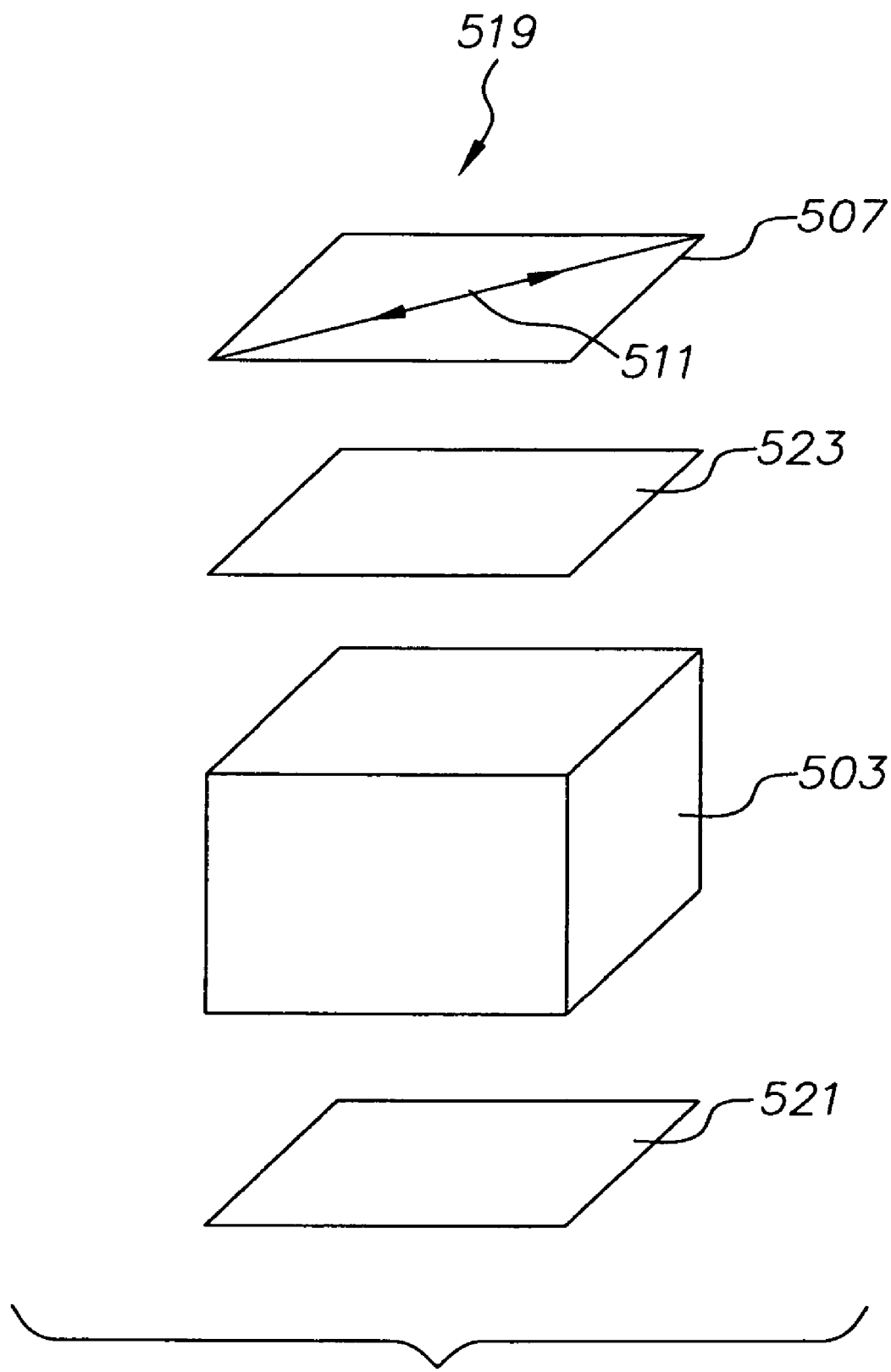

In LCD 501 shown in FIG. 5A, the liquid crystal cell 503 is placed between the polarizer 505 and analyzer 507. Transmission axis of the polarizer 509 and analyzer 511 form angle 90±10° thus, pair of polarizer 509 and analyzer 511 are said to be "crossed polarizer". A multilayer optical compensator 512 is placed between the polarizer 505 and the liquid crystal cell 503. It can also be placed between the liquid crystal cell 503 and the analyzer 507. LCD 513 shown schematically in FIG. 5B has two multilayer optical compensators 515, 517 placed on the both sides of the liquid crystal cell 503. FIG. 5C shows an application example of multilayer optical compensator in a reflective type LCD 519. The liquid crystal cell 503 is located between the polarizer 505 and a reflective plate 521. In the figure, the multilayer compensator 523 is placed between the liquid crystal cell 503 and the polarizer 505. However, it can also be placed between the reflective plate 521 and the liquid crystal cell 503.

Compared to the prior art, embodiments of the present invention avoid retardation increasing agents that could cause undesired coloration or could diffuse out of the compensator causing retardation loss and/or unwanted chemistry, do not require the use of liquid crystal compounds and its alignment procedure, provide enhanced optical compensation in a relatively thin (<200 μm) structure, and are easily manufactured.

PARTS LIST 101 film
103 plane of the film
201 VA liquid crystal cell in OFF state
203 VA liquid crystal cell in ON state
205 liquid crystal optic axis
207 liquid crystal cell substrate
209 light propagating cell normal direction
211 light propagating oblique direction
301 OCB liquid crystal cell in OFF state
303 OCB liquid crystal cell in ON state
305 liquid crystal optic axis
307 cell middle plane
309 cell boundaries
401 multilayer optical compensator
403 multilayer optical compensator
405 multilayer optical compensator
407 A layer
409 B layer
411 A layer
413 B layer
415 B layer
417 B layer
419 A layer
421 A layer
501 LCD
503 liquid crystal cell
505 polarizer
507 analyzer
509 transmission axis of polarizer
511 transmission axis of analyzer
512 multilayer optical compensator
513 LCD
515 multilayer optical compensator
517 multilayer optical compensator
519 LCD
521 reflective plate
523 multilayer optical compensator
nx index of refraction in x direction
ny index of refraction in y direction
nz index of refraction in z direction
$\Delta n_{th}$ out-of-plane birefringence Δn$_{in}$ in-plane birefringence
d thickness of the layer or film
R$_{th}$ out-of-plane retardation
R$_{in}$ in-plane retardation
λ wavelength
T$_g$ glass transition temperature

What is claimed is:

1. A multilayer compensator comprising one or more polymeric first layers and one or more polymeric second layers, wherein:
    said first layers comprise a polymer having an out-of-plane (Δn$_{th}$) birefringence not more negative than −0.01 or not more positive than +0.01;
    said second layers comprise an amorphous polymer having an out-of-plane birefringence more negative than −0.01 or more positive +0.01;
wherein the term "amorphous" means that the polymer does not show long range order by X-ray diffraction and analysis; and
    the overall in-plane retardation (R$_{in}$) of said multilayer compensator is greater than 20 nm and the out-of-plane retardation (R$_{th}$) of said multilayer compensator is more negative than −20 nm in which case at least one second layer includes a polymer containing in the backbone a non-visible chromophore group and has a T$_g$ above 180° C. without containing a non-visible chromophore off the backbone or (b) more positive than −20nm in which case at least one second layer includes a polymer which contains off the backbone a non-visible chromophore group and has a glass transition temperature (T$_g$) above 160° C., and
wherein the in-plane retardation (Rin) of said one or more first layers is 30% or less of the overall in-plane retardation (Rin) of said multilayer compensator.

2. The multilayer compensator of claim 1 wherein at least two of the layers are contiguous.

3. The multilayer compensator of claim 1 wherein all of said first and said second layers are contiguous.

4. The multilayer compensator of claim 1 wherein the second layers have a combined thickness of less than 30 micrometers.

5. The multilayer compensator of claim 1 wherein the second layers have a combined thickness of from 1.0 to 10 micrometers.

6. The multilayer compensator of claim 1 wherein the second layers have a combined thickness of from 2 to 8 micrometers.

7. The multilayer compensator of claim 1 wherein the overall in plane retardation (R$_{in}$) of said multilayer compensator is between 21 and 200 nm.

8. The multilayer compensator of claim 1 wherein the overall in-plane retardation (R$_{in}$) of said multilayer compensator is between 25 and 150 nm.

9. The multilayer compensator of claim 1 wherein the overall in-plane retardation (R$_{in}$) of said multilayer compensator is between 25 and 100 nm.

10. The multilayer compensator of claim 1 wherein The combined thickness of the first and second layer is less then 200 micrometers.

11. The multilayer compensator of claim 1 wherein the combined thickness of the first and second layers is from 40 to 150 micrometers.

12. The multilayer compensator of claim 1 wherein the combined thickness of the first and second layers is from 80 to 110 micrometers.

13. The multilayer compensator of claim 1 wherein the out-of-plane retardation (R$_{th}$) of said multilayer compensator is more negative than −20 nm.

14. The multilayer compensator of claim 13 wherein at least one second layer comprises a polymer containing in the backbone a non-visible chromophore containing a vinyl, carbonyl, amide, imide, ester, carbonate aromatic, sulfate, or azo, phenyl, naphthyl, biphenyl, bisphenol, or thiophene group.

15. The multilayer compensator of claim 13 wherein at least one second layer comprises a copolymers containing (1) a poly(4,4'-hexafluoroisopropylidene-bisphenol) terephthalate-co-isophtha (2) a poly(4,4'-hexahydro-4,7-methanoindan-5-ylidene bisphenol) terephthalate, (3) a poly(4,4'-isopropylidene-2,2'6,6'tetrachlorobisphenol) terephthalate-co-isophthalate, (4) a poly(4,4'-hexafluoroisopropylidene)-bisphenol-co-(2-norbornylidene)-bisphenol terephthalate, (5) a poly(4,4'-hexahydro-4,7-methanoindan5ylidene)-bisphenol-co-(4,4'-isopropylidene-2,2'6,6'-tetrabromo)-bisphenol terephthalate, (6) a poly(4,4'-isopropylidene-bisphenol-co-4,4'(2-norbornylidene) bisphenol) terephthalate-co-isophthalate, (7) a poly(4,4'-hexafluoroisopropylidene-bisphenol-co-4,4'-(2-norbornylidene) bisphenol) terephthalate-co-isophthalate, or (8) copolymers of any two or more of the foregoing.

16. The multilayer compensator of claim 13 wherein at least one first layer contains a polymer that comprises triacetylcellulose, cellulose diacetate, cellulose acetate butyrate, polycarbonate, cyclic polyolefin or polyarylate containing fluorene groups.

17. The multilayer compensator of claim 1 wherein the out-of-plane retardation (R$_{th}$) of said multilayer compensator is more positive than +20 nm.

18. The multilayer compensator of claim 17 wherein at least one second layer includes a polymer which contains off the backbone a vinyl, carbonyl, amide, imide, ester, carbonate, aromatic, sulfone, or azo group.

19. The multilayer compensator of claim 17 wherein the non-visible chromophore group includes a carbonyl, amide, imide, ester, carbonate, phenyl, naphthyl, biphenyl, bisphenol, or thiophene group.

20. The multilayer compensator of claim 17 wherein the non-visible chromophore group includes a heterocyclic or carbocyclic aromatic group.

21. The multilayer compensator of claim 17 wherein at least one second layer comprises a polymer selected from the group consisting of (A) poly(4 vinylphenol), (B) poly(4 vinylbiphenyl), (C) poly (N-vinylcarbazole), (D) poly(methylcarboxyphenylmethacrylamide),(E) poly[(1-acetylindazol-3-ylcarbonyloxy)ethylene], (F) poly(phthalimidoethylene), (G) poly(4-(1-hydroxy-1-methylpropyl)styrene), (H) poly(2-hydroxymethylstyrene), (I) poly(2-dimethylaminocarbonylstyrene),J) poly(2-phenylaminocarbonylstyrene), (K) poly(3-(4-biphenylyl)styrene), (L) poly(4-(4-biphenylyl)styrene), (M) poly(4-cyanophenyl methacrylate), (N) poly(2,6-dichlorostyrene), (O) poly(perfluorostyrene), (P) poly(2,4-diisopropylstyrene), (Q) poly(2,5-diisopropylstyrene), and (and R) poly(2,4,6-trimethylstyrene) or (S) copolymers of any two or more of the foregoing.

22. The multilayer compensator of claim 21 wherein at least one first layer contains a polymer that comprises triacetylcellulose, cellulose diacetate, cellulose acetate butyrate, polycarbonate, cyclic polyolefin, polystyrene or polyarylate containing fluorene groups.

23. A liquid crystal display comprising a liquid crystal cell, a pair of crossed polarizers located one on each side of the cell, and at least one compensator of claim 1.

24. The liquid crystal display of claim 23 wherein said liquid crystal cell is a vertically aligned cell, a twisted nematic cell, an in-plane switching mode cell, or a optically compensated bend liquid crystal cell.

25. A liquid crystal display comprising a liquid crystal cell, at least one polarizer, a reflective plate, and at least one compensator of claim 1.

26. The liquid crystal display of claim 25 wherein said liquid crystal cell is a vertically aligned cell, a twisted nematic cell, an in-plane. switching mode cell, or a optically compensated bend liquid crystal cell.

27. A process for forming a compensator for an LC display comprising coating or co-casting one or more second layers that contain an amorphous polymer in a solvent onto one or more first layers that contain a polymer, and stretching the first layers and second layers such that;

said first layers comprise the polymer having an out-of-plane ($\Delta n_{th}$) birefringence not more negative than −0.01 or not more positive than +0.01;

said second layers comprise the amorphous polymer having an out-of-plane birefringence more negative than −0.01 or more positive than +0.01 wherein the term "amorphous" means that the polymer does not show long range order by X-ray diffraction analysis; and the overall in-plane retardation ($R_{in}$) of said multilayer compensator is greater than 20mm and the out-of-plane retardation ($R_{th}$) of said multilayer compensator is (a) more negative than −20nm in which case at least one second layer includes a polymer containing in the backbone a non-visible chromophore group and has a $T_g$ above 180° C. without containing a non-visible chromophore off of the backbone, or (b) more positive than +20 nm in which case at lease one second layer includes a polymer which contains off the backbone a non-visible chromophore group and has a glass transition temperature (Tg) above 160° C., and wherein the in-plane retardation (Rin) of said one or more first layers is 30% or less of the overall in-plane retardation (Rin) of said multilayer compensator.

28. The process of claim 27, wherein said stretching includes restraining at least one side of the first and second layers and drying the first and second layers by application of heat to the first and second layer.

29. The process of claim 27, further comprising drying the first and second layers to remove the solvent prior to application of heat and then stretching the first and second layers.

30. The process of claim 27 wherein the out-of-plane retardation ($R_{th}$) of said multilayer compensator is more negative than −20 nm.

31. The process of claim 30 wherein at least one second layer comprises a polymer containing in the backbone a non-visible chromophore containing a vinyl, carbonyl, amide, imide, ester, carbonate, aromatic, sulfone, or azo, phenyl, naphthyl, biphenyl, bisphenol, or thiophene group.

32. The process of claim 30 wherein at least one second layer comprises a copolymers containing (1) a poly(4,4'hexafluoroisopropylidene-bisphenol) terephthalate-co-isophthalate, (2) a poly(4,4'-hexahydro-4,7-methanoindan-5-ylidene bisphenol) terephthalate, (3) a poly(4,4'-isopropylidene-2,2'6,6'-tetrachlorobisphenol) terephthalate-co-isophthalate, (4) a poly(4,4'-hexafluoroisopropylidene)-bisphenol-co-(2-norbornylidene)-bisphenol terephthalate, (5) a poly(4,4'-hexahydro-4,7-methanoindan-5-ylidene)-bisphenol-co-(4,4'-isopropylidene-2,2'6,6'-tetrabromo)-bisphenol terephthalate, (6) a poly(4,4'-isopropylidene-bisphenol-co-4,4'-(2-norbornylidene) bisphenol) terephthalate-co-isophthalate, (7) a poly(4,4'-hexafluoroisopropylidene-bisphenol-co-4,4'-(2-norbornylidene) bisphenol) terephthalate-co-isophthalate, or (8) copolymers of any two or more of the foregoing.

33. The process of claim 32 wherein at least one first layer contains a polymer that comprises triacetylcellulose, cellulose diacetate, cellulose acetate butyrate, polycarbonate, cyclic polyolefin or polyarylate containing fluorene groups.

34. The process of claim 27 wherein the out-of-plane retardation ($R_{th}$) of said multilayer compensator is more positive than +20 nm.

35. The process of claim 34 at least one second layer includes a polymer which contains off the backbone a vinyl, carbonyl, amide, imide, ester, carbonate, aromatic, sulfone, or azo group.

36. The process of claim 34 wherein the non-visible chromophore group includes a carbonyl, amide, imide, ester, carbonate, phenyl, naphthyl, biphenyl, bisphenol, or thiophene group.

37. The process of claim 34 wherein the non-visible chromophore group includes a heterocyclic or carbocyclic aromatic group.

38. The process of claim 34 wherein at least one second layer a polymer selected from the group consisting of (A) poly (4 vinylphenol), (B) poly (4 vinylbiphenyl), (C) poly (N-vinylcarbazole), (D) poly(methylcarboxyphenyl-methacrylamide), (E) poly[(1-acetylindazol-3-ylcarbonyloxy)ethylene], (F) poly(phthalimidoethylene), (G) poly(4-(1-hydroxy-1-methylpropyl)styrene), (H) poly(2-hydroxymethylstyrene), (I) poly(2-dimethylaminocarbonylstyrene), J) poly(2-phenylaminocarbonylstyrene), (K) poly(3-(4-biphenylyl) styrene), (L) poly(4-(4-biphenylyl)styrene), (M) poly(4-cyanophenyl methacrylate), (N) poly(2,6-dichlorostyrene), (O) poly(perfluorostyrene), (P) poly(2,4-diisopropylstyrene), (Q) poly(2,5-diisopropylstyrene), and (and R) poly(2,4,6-trimethylstyrene) or (S) copolymers of any two or more of the foregoing.

39. The process of claim 38 wherein at least one first layer contains a polymer that comprise triacetylcellulose, cellulose diacetate, cellulose acetate butyrate, polycarbonate cyclic polyolefin, polystyrene or polyarylate containing fluorene groups.

40. A liquid crystal display comprising a liquid crystal cell, a pair of crossed polarizers located one on each side of the cell, and at least one compensator made by the process of claim 27.

41. The liquid crystal display of claim 40 wherein said liquid crystal cell is a vertically aligned cell, a twisted nematic cell, an in-plane switching mode cell, or a optically compensated bend liquid crystal cell.

42. A liquid crystal display comprising a liquid crystal cell, at least one polarizer, a reflective plate, and at least one compensator made by the process of claim 27.

43. The liquid crystal display of claim 42 wherein said liquid crystal cell is a vertically aligned cell, a twisted nematic cell, an in-plane switching mode cell, or an optically compensated bend liquid crystal cell.

* * * * *